(12) United States Patent
Iyer et al.

(10) Patent No.: US 11,036,866 B2
(45) Date of Patent: Jun. 15, 2021

(54) SYSTEMS AND METHODS FOR OPTIMIZING CONTROL FLOW GRAPHS FOR FUNCTIONAL SAFETY USING FAULT TREE ANALYSIS

(71) Applicant: DENSO Corporation, Kariya (JP)

(72) Inventors: Gopalakrishnan Iyer, Santa Clara, CA (US); Ameer Kashani, Southfield, MI (US)

(73) Assignee: DENSO Corporation, Kariya (JP)

(*) Notice: Subject to any disclaimer, the term of this patent is extended or adjusted under 35 U.S.C. 154(b) by 226 days.

(21) Appl. No.: 16/164,088

(22) Filed: Oct. 18, 2018

(65) Prior Publication Data
US 2020/0125732 A1  Apr. 23, 2020

(51) Int. Cl.
*G06F 21/57* (2013.01)
*G06F 11/07* (2006.01)
(Continued)

(52) U.S. Cl.
CPC ........ *G06F 21/577* (2013.01); *G06F 11/079* (2013.01); *G06F 11/0796* (2013.01);
(Continued)

(58) Field of Classification Search
CPC ............ G06F 21/577; G06F 16/9027; G06F 16/9024; G06F 11/079; G06F 11/0796; G06F 11/2252; G06F 11/3612; G06F 8/33
See application file for complete search history.

(56) References Cited

U.S. PATENT DOCUMENTS

| | | | |
|---|---|---|---|
| 5,448,737 A | | 9/1995 | Burke et al. |
| 5,790,858 A | * | 8/1998 | Vogel ................. G06F 11/3612 714/35 |

(Continued)

FOREIGN PATENT DOCUMENTS

WO    2017178902    10/2017

OTHER PUBLICATIONS

N. G. Leveson, S. S. Cha and T. J. Shimeall, "Safety verification of Ada programs using software fault trees," in IEEE Software, vol. 8, No. 4, pp. 48-59, Jul. 1991, doi: 10.1109/52.300036. (Year: 1991).*

(Continued)

*Primary Examiner* — Robert B Leung
(74) *Attorney, Agent, or Firm* — Christopher G. Darrow; Darrow Mustafa PC

(57) ABSTRACT

System, methods, and other embodiments described herein relate to improving control flow in a program for safety-related functions. In one embodiment, a method includes identifying a safety-related function of the program. The safety-related function is associated with functionality performed by the program that effects whether an associated device operates according to a functional safety standard. The method includes integrating a fault tree for the safety-related function into associated portions of a control flow graph of the program. The control flow graph identifies at least procedural control flows within the program, and the fault tree indicates combinations of conditions in the program that produce faults by the program. The method includes providing the control flow graph as an electronic output to improve the control flow of the program.

20 Claims, 9 Drawing Sheets

(51) Int. Cl.
  *G06F 16/901* (2019.01)
  *G06F 11/22* (2006.01)
  *G06F 11/36* (2006.01)

(52) U.S. Cl.
  CPC ...... *G06F 11/2252* (2013.01); *G06F 11/3612* (2013.01); *G06F 16/9024* (2019.01); *G06F 16/9027* (2019.01)

(56) References Cited

U.S. PATENT DOCUMENTS

| | | | |
|---|---|---|---|
| 5,799,143 A * | 8/1998 | Butt | G06F 11/3612 712/227 |
| 7,047,523 B1 | 5/2006 | Liggesmeyer | |
| 7,284,274 B1 | 10/2007 | Walls et al. | |
| 7,302,707 B1 | 11/2007 | Weber et al. | |
| 7,577,992 B2 | 8/2009 | Abadi et al. | |
| 9,128,728 B2 | 9/2015 | Siman | |
| 9,767,292 B2 | 9/2017 | Baji-Gal | |
| 2004/0255277 A1 | 12/2004 | Berg et al. | |
| 2005/0015752 A1 | 1/2005 | Alpern et al. | |
| 2006/0161978 A1 | 7/2006 | Abadi et al. | |
| 2009/0282393 A1 | 11/2009 | Costa et al. | |
| 2009/0289309 A1 * | 11/2009 | Ye | H01L 21/31116 257/384 |
| 2010/0146624 A1 | 6/2010 | Meyer et al. | |
| 2011/0209126 A1 | 8/2011 | Fehnker et al. | |
| 2011/0296388 A1 | 12/2011 | Rohde et al. | |
| 2013/0055208 A1 | 2/2013 | Murthy | |
| 2013/0239219 A1 | 9/2013 | Siman | |
| 2014/0208297 A1 | 7/2014 | Chockler et al. | |
| 2014/0359776 A1 | 12/2014 | Liu | |
| 2015/0142138 A1 * | 5/2015 | Mohan | G05B 19/048 700/20 |
| 2016/0170868 A1 * | 6/2016 | Hoefig | G06F 11/3684 714/38.1 |
| 2016/0171506 A1 * | 6/2016 | Hofig | G06Q 30/018 705/317 |
| 2016/0300063 A1 | 10/2016 | Daymont | |
| 2017/0212829 A1 | 7/2017 | Bales et al. | |

OTHER PUBLICATIONS

Cha et al., Safety Verification in Murphy Using Fault Tree Analysis, Proceedings of the International Conference on Software Engineering, Apr. 1988, pp. 377-386.

* cited by examiner

```
Source Code 200

...
Printf(char *var){
While (var[i] != 'x\00'):
Putc(var[i]; i++;
}
...

#include <stdio.h>
Int main()[
Printf("Hello");
return 0;
]
```

FIG. 2

SYSTEMS AND METHODS FOR OPTIMIZING CONTROL FLOW GRAPHS FOR FUNCTIONAL SAFETY USING FAULT TREE ANALYSIS

TECHNICAL FIELD

The subject matter described herein relates in general to systems and methods for optimizing a control flow graph, and, in particular, to identifying safety-related functions in a program and optimizing the control flow graph according thereto.

BACKGROUND

The development of a software program can be a task that accounts for many different aspects that may threaten the integrity of the program. For example, the program can include different vulnerabilities in relation to data flows, program flows, and so on. Malicious attackers may exploit these vulnerabilities to manipulate data and/or maliciously redirect the program. This malicious manipulation can result in unintended actions by the program such as runtime errors, data destruction, data exposure, bypass authentication features, and so on. Moreover, the program can include native problems that may result in unintended faults corresponding with combinations of different internal states of the program.

As such, when a program is to provide functionality such as controlling a vehicle or other safety-critical functions such attacks and faults can be problematic since the well-being of nearby individuals (e.g., pedestrians and occupants of the vehicle) is likely at stake. Accordingly, ensuring that a program conforms to desired standards in relation to formatting, security, and other standards to prevent these malicious attacks and faults can be a significant difficulty especially when a program is relatively complex (e.g., includes many different relationships between functions, data structures, etc.). In general, developers may reference control flow graphs and/or other tools in attempts to optimize a program and/or to better understand relationships between different functions/segments within the program. However, present approaches produce large complex graphs that can be impractical for a developer to interpret resulting in unnoticed vulnerabilities remaining in the program. Similarly, adding instrumentation into the source code of the program to provide security against the malicious attacks and faults can further complicate development. Consequently, the program flow and fault resiliency of a program may end up being inadequately protected resulting in the program potentially being susceptible to failures.

SUMMARY

In one embodiment, example systems and methods associated with instrumenting safety-related functions through integrating fault trees within control flow graphs are disclosed. As previously noted, current approaches to identifying particular aspects of source code and instrumenting the source code to provide runtime checks are generally inadequate because the approaches suffer from issues with being overly complex and/or relying significantly on manual support.

Therefore, in one embodiment, a fault control system that integrates fault trees and control flow graphs to ensure both functional safety and program flow integrity of various paths in the program is disclosed. Moreover, the fault control system, in one embodiment, uses the integrated control flow graph to provide additional functionality such as the automatic instrumentation of source code of the program with runtime checks that validate program flow and avoid fault conditions identified in the fault tree.

In one approach, the disclosed fault control system executes to develop both the control flow graph and the fault tree in parallel. For example, the fault control system analyzes the source code of the program to identify control flow characteristics while also analyzing functions within the source code to identify safety-related functions. The safety-related functions are, for example, functions of the program that potentially effect aspects of the program and/or an associated device being controlled by the program that relate to functional safety. In general, functional safety refers to the safe operation of the associated device in relation to risk of physical injury to persons or damage to the device itself. Thus, the safety-related functions can include functions that, for example, control a vehicle to brake, or perform other functions that, if faults/failures in the function occur, injury or damage can result.

As such, the fault control system identifies the safety-related functions in order to further analyze those functions by performing fault tree analysis. Through the fault tree analysis, the fault control system produces a fault tree. The fault tree, in one aspect, embodies combinations of inputs, internal states, or other conditions of the program that may result in faults (e.g., incorrect outputs, critical stops, etc.) within the program. The fault control system generally represents such failures/faults using Boolean logic within the fault tree to identify combinations of conditions that produce the faults.

Moreover, while producing the fault tree, the fault control system is also generating the control flow graph. In general, the fault control system analyzes the source code of the program either in real-time or in response to a request to identify control flow characteristics of the program. The control flow characteristics include, in one embodiment, aspects that influence intra-procedural and/or inter-procedural control flow of the program (e.g., control data) such as function calls, return addresses, stack pointers, and so on. In further aspects, the control flow characteristics also include data characteristics about non-control data arguments. Thus, in addition to identifying the control data, the fault control system may identify data characteristics for non-control data that include aspects relating to a state of an associated data argument such as when the data argument is instantiated, used, modified and so on. Moreover, the data characteristics may also include relationships associated with the data argument such as functions to which the data argument is passed, which functions may modify the data argument, and so on.

In either case, the fault control system generates the control flow graph to represent the program flow and other noted aspects according to the control flow characteristics. Thus, the fault control system generates nodes, directed edges, and tags/makers within the nodes that relate to various aspects of the source code. In one approach, the fault control system dynamically updates the control flow graph in real-time such that as the source code is being modified (e.g., amended, adjusted, etc.), the fault control system is also adding new segments into the control flow graph and/or modifying existing segments to further represent the control flow characteristics.

Thus, the fault control system, in one embodiment, integrates the fault tree into the control flow graph in order to further identify important aspects of the program using the control flow graph. In one aspect, the fault control system integrates the fault tree by annotating nodes/edges of the control flow graph with the conditions identified by the fault tree. Thus, various blocks of the source code that are associated with the conditions identified by the fault tree are annotated in the control flow graph to further identify the hazardous paths in the control flow graph for which certain conditions/occurrences may result in faults.

Consequently, the control flow graph embodies various critical aspects of the program within a single enhanced data structure. As such, the fault control system, in one embodiment, provides the control flow graph to further modules/systems to facilitate additional functionality. For example, in one embodiment, the fault control system uses the control flow graph as a mechanism to automatically instrument the source code. Because the control flow graph is generated to include the information about safety-related functions in addition to other aspects that are to be instrumented, the control flow graph can serve as a guidepost to the additional systems/modules to facilitate securing/fault-proofing the program flow using instrumentation. As such, the system automatically integrates the instrumentation according to the control flow graph. In this way, the fault control system improves the resiliency of the program against faults while also securing the program against malicious attacks against control and non-control aspects.

In one embodiment, a fault control system for improving control flow in a program for safety-related functions is disclosed. The fault control system includes one or more processors and a memory that is communicably coupled to the one or more processors. The memory stores an analysis module including instructions that when executed by the one or more processors cause the one or more processors to identify a safety-related function of the program. The safety-related function is associated with functionality performed by the program that effects whether an associated device operates according to a functional safety standard. The memory stores a graph module including instructions that when executed by the one or more processors cause the one or more processors to integrate a fault tree for the safety-related function into associated portions of a control flow graph of the program. The control flow graph identifies at least procedural control flows within the program, and the fault tree indicates combinations of conditions in the program that produce faults by the program. The graph module includes instructions to provide the control flow graph as an electronic output to improve the control flow of the program.

In one embodiment, a non-transitory computer-readable medium is disclosed. The computer-readable medium stores instructions that when executed by one or more processors cause the one or more processors to perform the disclosed functions. The instructions include instructions to identify a safety-related function of the program. The safety-related function is associated with functionality performed by the program that effects whether an associated device operates according to a functional safety standard. The instructions include instructions to integrate a fault tree for the safety-related function into associated portions of a control flow graph of the program. The control flow graph identifies at least procedural control flows within the program, and the fault tree indicates combinations of conditions in the program that produce faults by the program. The instructions include instructions to provide the control flow graph as an electronic output to improve the control flow of the program.

In one embodiment, a method of improving control flow in a program for safety-related functions is disclosed. The method includes identifying a safety-related function of the program. The safety-related function is associated with functionality performed by the program that effects whether an associated device operates according to a functional safety standard. The method includes integrating a fault tree for the safety-related function into associated portions of a control flow graph of the program. The control flow graph identifies at least procedural control flows within the program, and the fault tree indicates combinations of conditions in the program that produce faults by the program. The method includes providing the control flow graph as an electronic output to improve the control flow of the program.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 2 illustrates one example of source code of a program.

DETAILED DESCRIPTION

Figure 1:
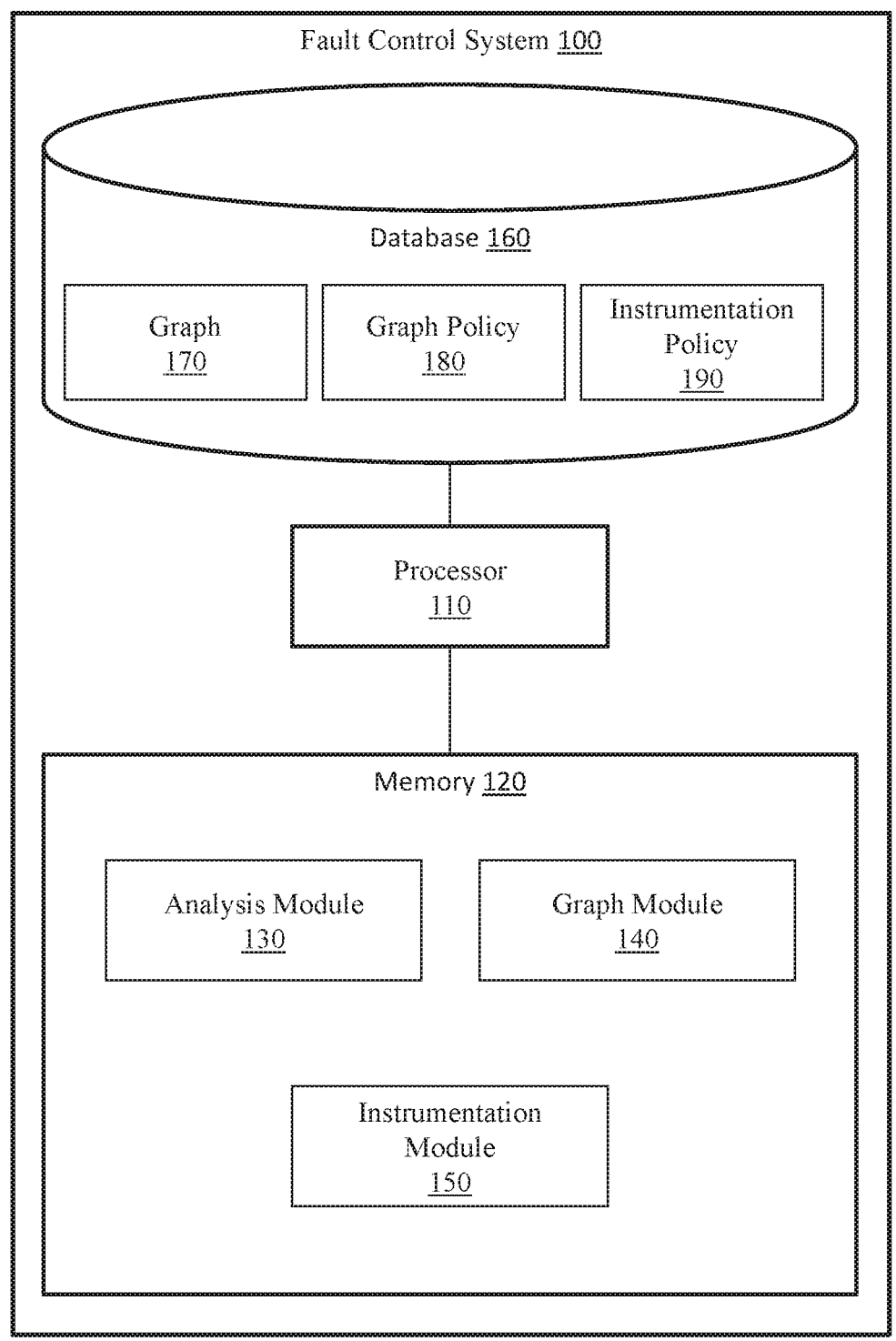
FIG. 1 illustrates one embodiment of a fault control system that is associated with generating control flow graphs and performing other functions in relation to source code of a program.

In one embodiment, example systems and methods associated with implementing runtime checks for safety-related functions through integrating fault trees within control flow graphs are disclosed. As previously noted, current approaches to control flow and fault tree analysis are generally overly complex and/or rely significantly on manual support, which results in ineffective solutions.

Therefore, in one embodiment, a fault control system is disclosed that executes both control flow analysis and fault tree analysis simultaneously while further integrating resulting fault trees within a control flow graph to provide a streamlined solution that improves both functional safety and program flow integrity in the program. Thus, the fault control system, in one embodiment, uses the enhanced control flow graph to automatically instrument the program thereby automatically accounting for runtime checks that validate program/data flow and avoid fault conditions to ensure compliance with functional safety standards.

In one approach, the disclosed fault control system generates both the control flow graph and the fault tree in parallel through a process of combined analysis. For example, the flow control system analyzes source code of the program to identify control flow characteristics while also analyzing functions within the source code to identify safety-related functions. The safety-related functions are, for example, functions of the program that relate to functional safety of an associated device. In general, functional safety refers to safe operation of the associated device in relation to risk of physical injury to persons or damage to the device itself. Thus, the safety-related functions can include functions that, for example, control a vehicle to brake, or perform other functions for which faults/failures can result in injury to persons or extensive damage to the device (e.g., vehicle).

To facilitate avoiding such issues, the fault control system identifies the safety-related functions and then analyzes those functions according to a fault tree analysis. Through the fault tree analysis, the fault control system produces a fault tree. The fault tree, in one aspect, embodies combinations of inputs, internal states, or other conditions that may result in faults (e.g., incorrect outputs, critical stops, etc.) within the program. In one approach, the fault control system identifies the combinations of conditions according to fault characteristics identified by a graph policy. In general, the graph policy may indicate particular aspects relating to hardware on which the program is executing, particular combinations of inputs/states, and so on. The fault control system generally represents such failures/faults using the fault tree to identify the combinations of conditions that produce the faults according to a systematic representation of logic and itemized conditions (e.g., inputs and associated values).

Moreover, while producing the fault tree, the fault control system is also generating the control flow graph. As will be better understood through the accompanying explanation, the control flow graph generally functions to represent vulnerabilities in relation to program flow and data flow for the program. That is, the control flow graph, in a basic form, is generated to represent which aspects of the program are vulnerable to malicious attacks that attempt to redirect the program, alter data associated with the program, and so on.

In general, the fault control system analyzes the source code of the program either in real-time or in response to a request to identify control flow characteristics of the program. The control flow characteristics include, in one embodiment, aspects that influence intra-procedural and/or inter-procedural control flow of the program (e.g., control data). In further aspects, the control flow characteristics also include data characteristics about non-control data arguments. In either case, the fault control system generates the control flow graph to represent the program flow according to the control flow characteristics. For example, the fault control system generates nodes, directed edges, and tags/makers within the nodes that relate to various aspects of the source code according to the program/data flow.

Additionally, the fault control system, in one embodiment, integrates the fault tree into the control flow graph in order to further identify important aspects (e.g., hazardous paths) of the program using a single representation. In one aspect, the fault control system integrates the fault tree by annotating nodes/edges of the control flow graph with the conditions identified by the fault tree. Thus, various blocks of the source code that are associated with the conditions identified by the fault tree are annotated in the control flow graph to further identify the hazardous paths in the control flow graph for which certain conditions may result in faults/errors.

Consequently, the control flow graph embodies various critical aspects of the program within a single enhanced data structure. Because the control flow graph is generated to include information about safety-related functions in addition to other aspects that are to be instrumented, the control flow graph can serve as a guidepost to the additional systems/modules to facilitate securing/fault-proofing the program flow using instrumentation. As such, the system automatically integrates the instrumentation according to the control flow graph. In this way, the fault control system facilitates resiliency of the program in relation to program flow integrity and functional safety by securing the program against faults and malicious attacks.

In further aspects, the fault control system also uses the control flow graph to generate a visual representation of the execution flow of the program and possible faults. In other words, the fault control system, in one approach, electronically displays the visual representation of the control flow graph within an integrated development environment (IDE) with real-time updates as a manner of informing a developer about the program while the program is being developed. Thus, providing the control flow graph in real-time facilitates ensuring the appropriate programmatic structure of the program in relation to control flow data arguments, non-control data arguments, and functional safety aspects. In this way, the fault control system improves the functionality of the program by facilitating better awareness of important aspects of the program during development.

Referring to FIG. 1, one embodiment of a fault control system 100 is illustrated. While arrangements will be described herein with respect to the fault control system 100, it will be understood that embodiments are not limited to a unitary system as illustrated. In some implementations, the fault control system 100 may be embodied as a cloud-computing system, a cluster-computing system, a distributed computing system, a software-as-a-service (SaaS) system, and so on. Accordingly, the fault control system 100 is illustrated and discussed as a single device for purposes of discussion but should not be interpreted as limiting the overall possible configurations in which the disclosed components may be configured. For example, the separate modules, memories, databases, and so on may be distributed among various computing systems in varying combinations.

The fault control system 100 also includes various elements. It will be understood that in various embodiments it may not be necessary for the fault control system 100 to have all of the elements shown in FIG. 1. The fault control system 100 can have any combination of the various elements shown in FIG. 1. Further, the fault control system 100 can have additional elements to those shown in FIG. 1. In some arrangements, the fault control system 100 may be implemented without one or more of the elements shown in FIG. 1. Further, while the various elements are shown as being located within the fault control system 100 in FIG. 1, it will be understood that one or more of these elements can be located external to the fault control system 100. Further, the elements shown may be physically separated by large distances.

Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the fault control system 100 is implemented to perform methods and other functions as disclosed herein relating to performing control flow and fault tree analysis on a program to produce a control flow graph that integrates a fault tree. The noted functions and methods will become more apparent with a further discussion of the figures. Furthermore, the fault control system 100 is shown as including a processor 110. Thus, in various implementations, the processor 110 may be a part of the fault control system 100, the fault control system 100 may access the processor 110 through a data bus or another communication pathway, the processor 110 may be a remote computing resource accessible by the fault control system 100, and so on. In either case, the processor 110 is an electronic device such as a microprocessor, an ASIC, a graphics processing unit (GPU) or another computing component that is capable of executing machine-readable instructions to produce various electronic outputs therefrom that may be used to control or cause the control of other electronic devices.

In one embodiment, the fault control system 100 includes a memory 120 that stores an analysis module 130, a graph module 140, and an instrumentation module 150. The memory 120 is a random-access memory (RAM), read-only memory (ROM), a hard-disk drive, a flash memory, or other suitable memory for storing the modules 130, 140, and 150. The modules 130, 140, and 150 are, for example, computer-readable instructions that when executed by the processor 110 cause the processor 110 to perform the various functions disclosed herein. In various embodiments, the modules 130, 140, and 150 can be implemented in different forms that can include but are not limited to hardware logic, an ASIC, components of the processor 110, instructions embedded within an electronic memory, and so on.

With continued reference to the fault control system 100, in one embodiment, the system 100 includes a database 160. The database 160 is, in one embodiment, an electronic data structure stored in the memory 120, a distributed memory, a cloud-based memory, or another data store and that is configured with routines that can be executed by the processor 110 for analyzing stored data, providing stored data, organizing stored data, and so on. Thus, in one embodiment, the database 160 stores data used by the modules 130, 140, and 150 in executing various determinations. In one embodiment, the database 160 stores a control flow graph 170. In further embodiments, the fault control system 100 stores the graph 170 in the memory 120, a specialized data structure, a cache memory of the processor 110, or another suitable data storage component. Similarly, the database 160, in one embodiment, stores a fault tree that identifies hazardous paths within the graph 170 along with, for example, conditions that can cause the paths to be hazardous.

As used herein, program refers to compiled machine code that is derived from source code. Thus, the program is, in one embodiment, a compiled program or portion thereof that is machine code. The phrase "machine code" as used herein generally refers to a program that is represented in machine language instructions that can be, for example, executed by a microprocessor such as the processor 110. Moreover, the machine code is generally understood to be a primitive or hardware-dependent language that is comprised of opcodes defined by an instruction set implemented by associated hardware. Furthermore, the machine code itself is further comprised of data values, register addresses, memory addresses, and so on. Of course, while the program is discussed as being machine code, in further embodiments, the program is assembly code or another intermediate representation derived from the source code.

The source code from which the program is compiled is comprised of, for example, functions, data structures, objects, statements, and so on. Instrumentation that is included as part of the source code is further comprised of the same elements (e.g., objects, statements, etc.). In general, the program is organized as a set of functions. In various renditions, the functions may be nested within one another as sub-functions. Moreover, the functions are generally comprised of a set of statements (e.g., loops, I/O statements, etc.) and are typically focused on a particular functionality. That is, each separate function is generally implemented to perform a particular task. Thus, sub-functions may implement sub-routines in support of a broader functionality of a parent function. In either case, the functions include source code that defines the statements forming the function itself and provide for implementing the functionality associated with the function.

Furthermore, as discussed herein, the noted modules 130, 140, and 150 may function as plugins into an integrated development environment or as standalone functionality. The integrated development environment (IDE) is a program or collection of programs that provide facilities for the development of software. For example, an IDE can include a source code editor, build tools, debuggers, compilers, interpreters, a graphical user interface (GUI), and so on. In general, IDEs are a mechanism for improving the efficiency of developers (i.e., programmers) through providing an overall environment with tools and other aspects that facilitate the creation of programs. Thus, as noted, in one or more arrangements, the modules 130, 140, and 150 are plugins that integrate with the IDE to provide additional functionality. Accordingly, in one approach, the modules 130, 140, and 150 access electronic data of the IDE including electronic input and output streams including, for example, code segments provided electronically into the IDE. The modules 130, 140, and 150 may leverage an application program interface (API) of the IDE to facilitate the access. Moreover, such access may be provided in the form of application hooks that automate (e.g., provide direct integral access) the integration of the modules 130, 140, and 150. In either case, the system 100 and the modules 130, 140, and 150 generally function cooperatively with the IDE. Thus, the IDE, in execution, generally manages the source code from which the program is compiled and may also provide for actually compiling the source code into the program.

Continuing with elements of the database 160, the graph 170 is a control flow graph that represents execution paths through the program. In further aspects, the graph 170 also represents data arguments and associated states of the data arguments at different nodes in the graph 170. Moreover, the graph 170, in one embodiment, includes annotations, tags, labels, or other identifiers of other relevant characteristics of the associated source code. As discussed in detail subsequently, the graph 170, in one embodiment, includes annotations within nodes/directed edges that identify corresponding aspects of a fault tree. Accordingly, the fault tree is, for example, integrated within the graph 170 alongside information about the program/data flow.

In one embodiment, the analysis module 130 and the graph module 140 function together to derive the graph 170 from source code as the source code is dynamically provided into the IDE. In alternative embodiments, the analysis module 130 and the graph module 140 operate to perform the noted functions in response to a specific request, intermittently, or prior to the source code being compiled.

The graph module 140 forms the graph 170 using, in one approach, nodes, and directed edges between the nodes. The nodes represent blocks of the source code while the directed edges between the nodes represent jumps/control handovers between the blocks. The blocks are, for example, atomic segments of code (e.g., uninterrupted) or at least integrally related segments of the source code. The directed edges, in one embodiment, indicate intra-procedural and/or inter-procedural control flow transfers between the blocks/segments. That is, the edges represent handovers, function calls, concrete and/or symbolic function arguments, and so on. In general, the directed edges illustrate transfers in the execution of the program between the separate blocks. Moreover, the graph module 140, in effect, overlays the fault tree onto the control flow graph 170 by identifying the edges, and nodes associated with the safety-related function(s) and by further annotating such sections of the graph 170 with the conditions in order to provide the fault tree as an integral aspect of the graph 170.

Additionally, in one embodiment, the graph module 140 uses data characteristics about non-control data arguments to annotate the control flow graph 170. For example, the graph module 140 produces the graph 170 to include annotations about data arguments within the source code. Some of the noted data arguments may relate back to the fault tree and inputs/internal values produced by the program. Accordingly, the graph module 140 can include various data arguments as part of the control flow graph 170 in order to integrate the fault tree and/or when the data arguments represent further risks such a data exposure.

As a general matter, the data arguments included as part of the control flow characteristics are non-control data arguments such as variables passed between functions. By contrast, the control data that is included within the control flow characteristics provide the basis for the actual structure of the graph 170 in the nodes and directed edges that affect execution paths of the program. In either case, the graph module 140 annotates the nodes and/or directed edges to include the fault tree and/or data characteristics associated with the nodes/edges. In this way, the graph module 140 produces the graph 170 to have a more comprehensive representation of potentially vulnerable aspects of the program that could be susceptible to malicious attacks and/or faults.

It should be appreciated that in separate embodiments the nodes and directed edges may be defined differently than set forth herein. For example, in one approach, the segments/blocks that comprise the nodes and conditions that define the directed edges and annotations of the fault tree integrated therewith are specified according to a graph policy. The graph policy 180 defines templates, example segments, and/or metrics for identifying the blocks/segments, conditions, transitions, and so on. As a general matter, the graph policy 180 is defined, for example, with various rules that are based on the characteristics associated with faults, intra-procedural and/or inter-procedural control flow, data arguments, and so on such that the analysis module 130 can identify the various aspects when parsing the source code. Moreover, the graph policy 180, in one approach, further defines how the fault tree derived from the safety-related function(s) is integrated with the graph 170 (e.g., which portions are annotated and with what information). Thus, the system 100 can be implemented to flexibly define aspects of the control flow graph 170 according to separate implementations.

Figure 3:
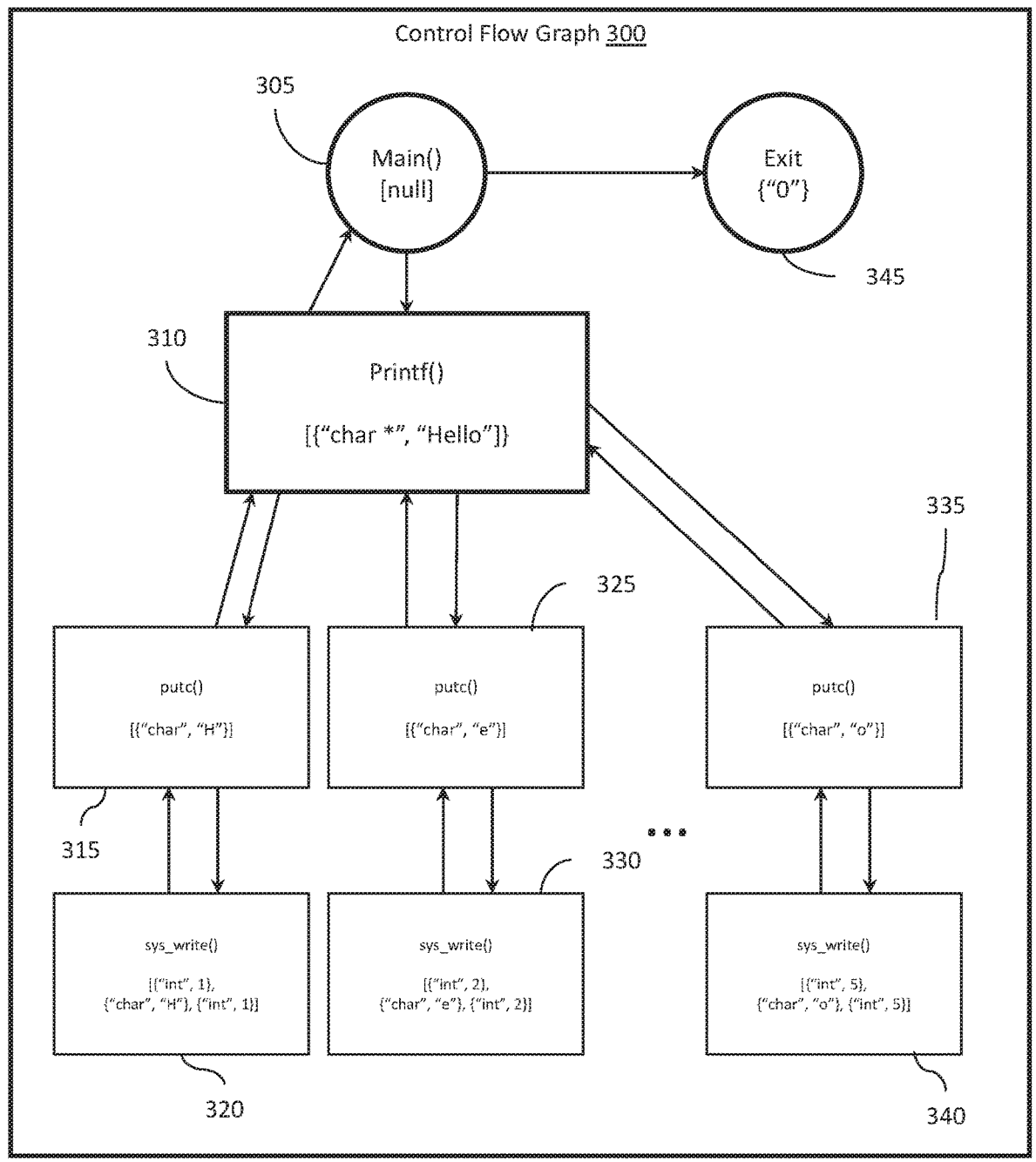
FIG. 3 illustrates one example of a control flow graph that the system of FIG. 1 derives from the source code of FIG. 2.

By way of example, FIG. 2 illustrates a sample segment of the source code of a program. Additionally, FIG. 3 illustrates an example control flow graph 300. The control flow graph 300 is an illustrative example of a graph as may be generated by the graph module 140 from inputs provided via the analysis module 130. Accordingly, the graph 300 includes nodes 305, 310, 315, 320, 325, 330, 335, 340, and 345 that correspond with segments/blocks of code from the source code 200. The graph 300 further illustrates directed edges between the nodes that correspond with relationships between the segments of the source code 200. In further aspects, while not explicitly illustrated in the graph 300, the graph module 140 includes the data characteristics of non-control data arguments within the graph 300. For example, the analysis module 130 may identify the string char as a non-control data argument. Thus, the data characteristics of the string char may indicate modifications by one or more functions such as Printf and Putc while also indicating where/when the string can be initialized as additional annotations in the graph 170.

Moreover, the separate nodes and directed edges are, for example, defined according to control flow characteristics of the source code. That is, the ways in which the blocks/segments of the source code inter-relate and delineations between the blocks/segments themselves are defined according to control flow characteristics of the source code. As will be discussed further subsequently, the graph module 140 generally identifies the control flow characteristics including, in one or more embodiments, data characteristics from the source code of the program and may do so according to a graph policy defined within the system 100.

Figure 4:
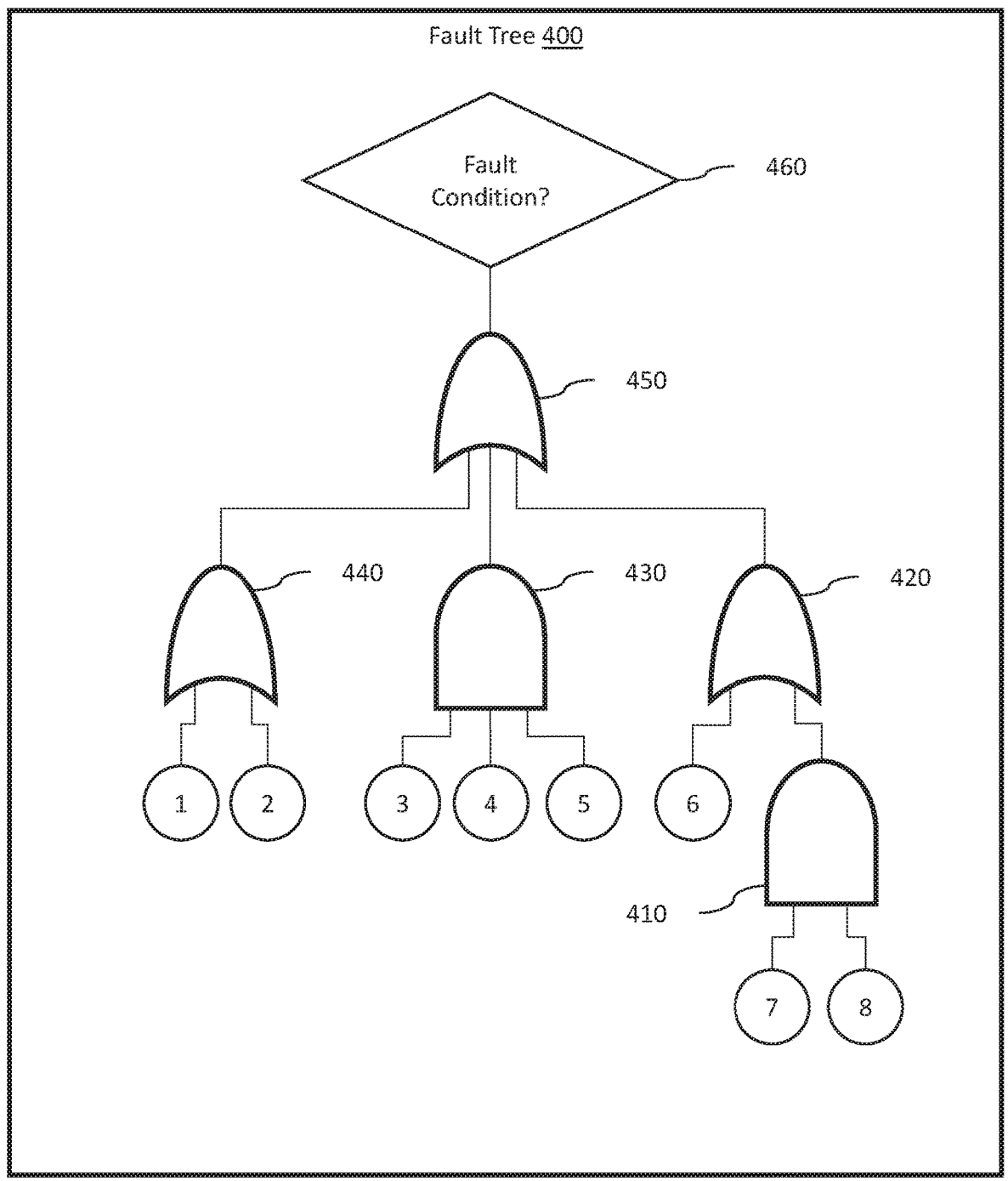
FIG. 4 illustrates one example of a fault tree that represents combinations of conditions with the use of logic gates.

FIG. 4 illustrates one example of a fault tree 400 as may be generated by the analysis module 130 and integrated into the graph 170 by the graph module 140. The fault tree 400 is illustrated as including logic gates 410, 420, 430, 440, and 450 which are shown as or-gates and and-gates. Inputs to the various logic gates include either outputs from other logic gates and/or conditions of the program. The conditions include, for example, internally generated values of variables, memory addresses, Input/Output values, hardware interactions, etc., and are represented by circles labeled with integers 1-8 in the fault tree 400. Thus, in practice, the analysis module 130 analyzes the source code according to, for example, an expected execution environment (e.g., hardware platform that is to execute the program) and using the graph policy 180 to identify the combinations of conditions along various control paths that can lead to safety violations or cause fatal failures in a system executing the program.

As shown in the fault tree 400, the or-gate 450 produces an indication of a potential fault/failure at output block 460 if any of the logic 440, 430, or 420 indicate an occurrence of noted conditions. Thus, the separate logic gates of 440, 430, and 420 can be associated with separate internal statements of a safety-related function. Moreover, as illustrated the logic gate 420 accepts inputs from a nested logic gate 410. Such an input may be representative of aspects conditioned on additional sub-functions/routines or a particular combination of events, variables being generated to have particular values, use of particular memory addresses/ranges, combinations of I/O, and so on. In general, the logic that is combined to form the fault tree and the arrangement of variables/conditions may take on many different forms in order to accurately represent the conditions leading to undesired states within the program that produce the faults.

In either case, as one example, the graph module 140 integrates the fault tree 400 into, for example, the control flow graph 300 of FIG. 3. While not illustrated in the provided figures, the graph module 140 generally integrates the fault tree 400 into the graph 300 by annotating the graph to specify the conditions in relation to where the conditions develop in the program flow of the program. That is, considering that the graph 170/300 represents the program flow, the graph module 140 translates the fault tree 400 into annotations that correspond with the nodes and directed edges where the combination of conditions develop. By way of example, the graph module 140 may annotate block 315 of graph 300 with indicators of values for the noted variable that when, in combination with a particular iteration result in a fault. The graph module 140 annotates the aspects of this combination from the fault tree 400 into the respective nodes and edges in order to enhance the control flow graph 300 with information about hazardous execution paths in the source code 200, which can be identified according to the annotations derived from the fault tree.

Figure 5:
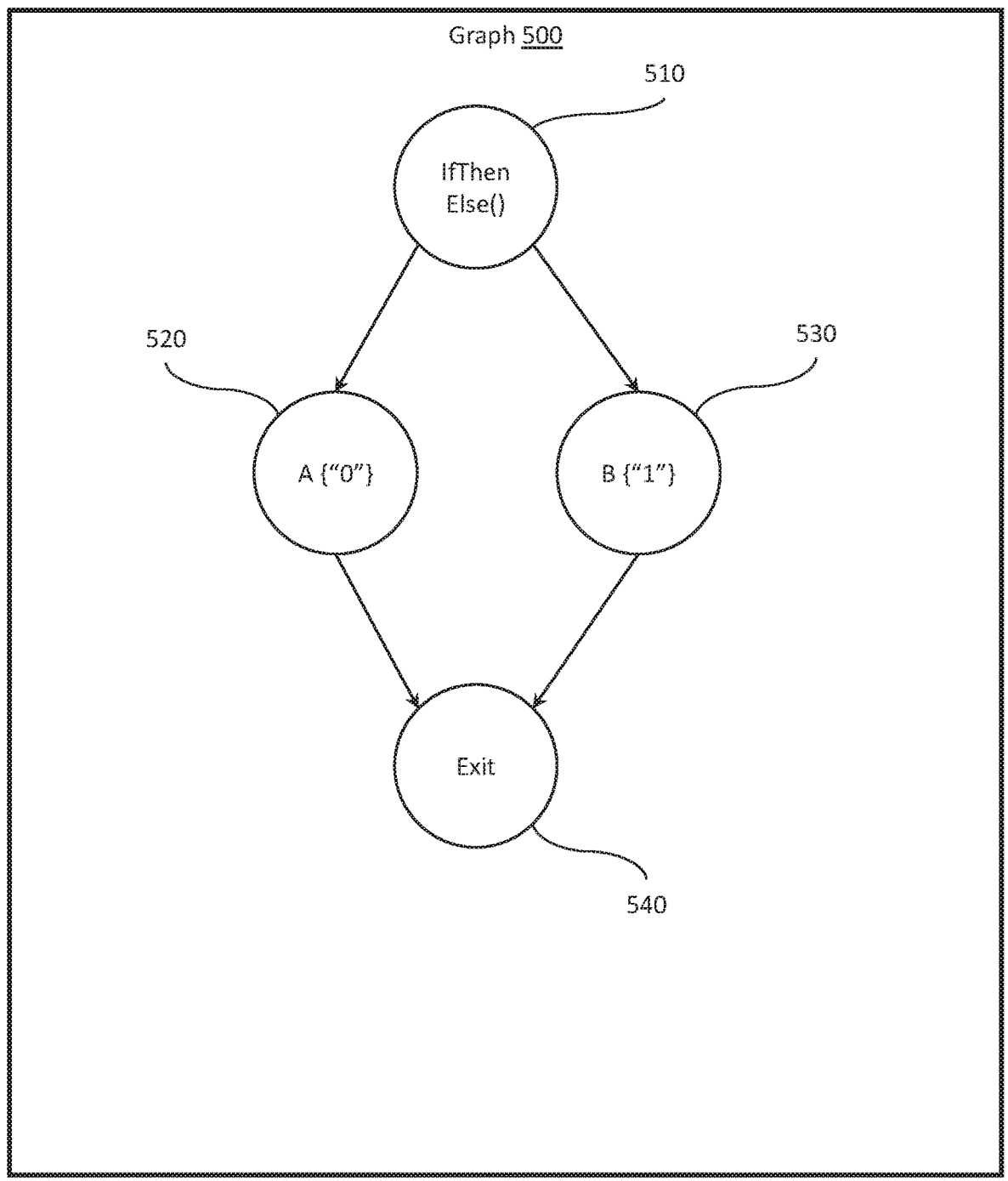
FIG. 5 illustrates a further example of a control flow graph.
Figure 6:
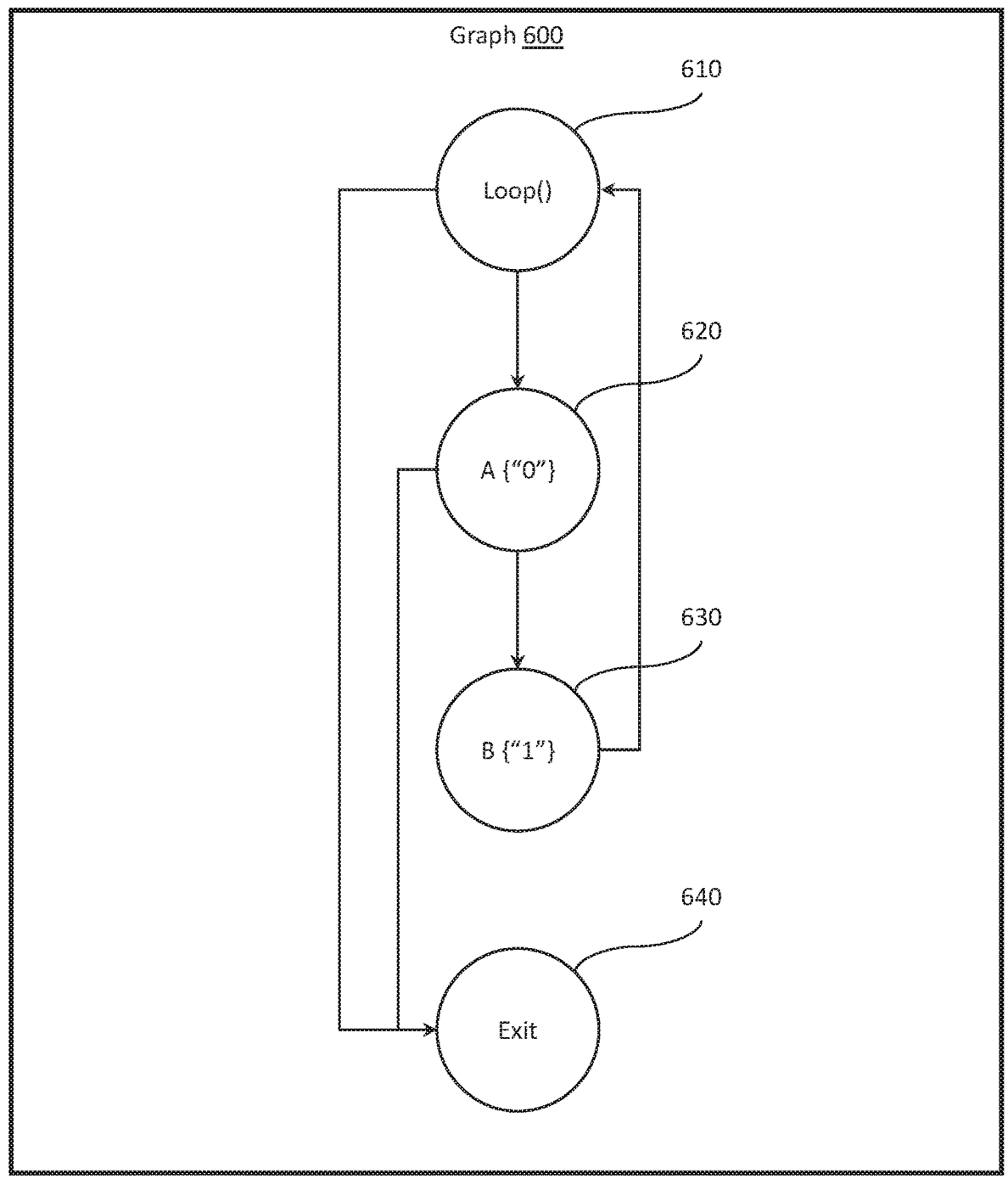
FIG. 6 illustrates an additional example of a control flow graph.

In either case, FIGS. 5 and 6 illustrate further examples of control flow graphs 500 and 600 that correspond with different segments of source code. For example, as illustrated in FIG. 5, the graph 500 includes four separate nodes 510, 520, 530, and 540 that correspond with separate segments of source code correlating with separate paths through an if-then-else statement as indicated by the corresponding directed edges. Moreover, FIG. 6 illustrates the graph 600 including nodes 610, 620, 630, and 640 that represent segments of code within an associated block/function. As illustrated, the graph 600 represents a loop that includes two separate exit conditions indicated by the separate directed edges leading to the exit node 640. Thus, the graph 170 can depict many different configurations of source code in order to represent an execution flow of a program.

As a further example of how the graph module 140 integrates a fault tree into the control flow graph, consider the separate paths illustrated in the graphs 500 and 600. In various circumstances, the graph module 140 annotates one or more directed edges associated with conditions represented by the fault tree. By way of example, the directed edge between nodes 510 and 530 of FIG. 5 may be annotated by the graph module 140 when a condition associated with the transition between nodes can result in a fault. Similarly, the graph module 140 can annotate exit conditions for blocks 610 and 620 when the fault tree indicates such nodes are associated with potential faults. In this way, the graph module 140 integrates the fault tree into the control flow graph to enhance information conveyed by the control flow graph about potential faults.

Moreover, it should be appreciated that the provided examples relate to relatively short code segments, and, as a general tendency, the graph 170 includes a plurality of nodes and directed edges therebetween. As one example, the "exit" nodes as illustrated in the example graphs 500 and 600, in various implementations, generally indicate transitions to separate code segments instead of actual program exits. Moreover, the graphs 500 and 600 are not illustrated along with non-control data arguments, but it should be appreciated that the separate nodes with the graphs 500 and 600 can be annotated to further specify aspects of related non-control data arguments. As such, the graph 170 facilitates better understanding by developers when rendered in a visual format and also provides for facilitating further automated functions through providing an understanding of the program flow and data characteristics to various modules.

As a further note, while the control flow graphs are discussed as including aspects relating to program flow and the fault trees, the system 100, in one approach, also includes aspects about non-control data arguments within the graph 170. As referred to herein, a data argument is generally a variable as described within the source code and can be of various types such as a string, integer, character, and so on. Furthermore, while the source code can include a plurality of such non-control data arguments, the analysis module 130, in one approach, selectively identifies data characteristics for particular ones of the data arguments according to conditions indicated by the graph policy 180. Thus, the inclusion of a data argument within the graph 170 may be contingent on the analysis module 130 determining that the data argument satisfies conditions for inclusion. While the conditions may vary according to implementation, in general, the graph policy indicates data arguments within the graph 170 that may be exposed to manipulation or are more sensitive (e.g., passwords) as data arguments that are to be included.

Continuing with the database 160 of FIG. 1, the instrumentation policy 190 defines various conditions and/or segments of source code for which the instrumentation module 150 includes instrumentation within the source code as will be discussed in greater detail subsequently. In general, the instrumentation can serve different purposes depending on a particular implementation. For example, the instrumentation can be integrated within a function to provide for controlling program flow (e.g., ensuring the program isn't misdirected), for debugging, for verifying data arguments (e.g., preventing manipulation of data values), for verifying I/O, for preventing faults, for redirecting the program when particular conditions occur, and so on. For example, in an instance where the program controls an advanced driving assistance system (ADAS) to automatically adjust how a vehicle is controlled on the road, the instrumentation may include security instrumentation to prevent malicious manipulation of the program flow and/or data values that could result in an accident and injury to passengers if the program is manipulated through a malicious attack. As a further example, where one or more known fault conditions exist in the program, the instrumentation redirects the program flow to a safe exit procedure upon detecting the occurrence of the condition.

In further aspects, the instrumentation policy 190 also defines instrumentation thresholds or at least metrics for generating the instrumentation thresholds. In one approach, the instrumentation policy 190 defines instrumentation thresholds for different classes of functions, data arguments, and so on in relation to when instrumentation is to be included in the program. For example, the instrumentation policy 190, in one embodiment, defines classes for functions/arguments according to a security level as may be tagged by a developer or derived according to defined metrics associated with code segments. In general, the separate classes and associated thresholds for security levels may relate to a vulnerability of a particular function/argument (e.g., exposure to manipulation) or to other aspects. As such, the instrumentation policy 190 may indicate different thresholds at which segments are to be instrumented in order to optimize inclusion of the instrumentation. Thus, in practice, the instrumentation module 150, for example, assesses the code segments and automatically includes the instrumentation according to the assessment when the noted thresholds are satisfied.

Moreover, the actual instrumentation itself that is included within the code segments is defined, in one embodiment, as templates within the aforementioned graph policy 180. For example, the templates define a set of standardized instrumentation that performs various functions in relation to controlling program flow, verifying I/O, providing additional functional hooks, providing data integrity to data arguments, and so on. The functions are generally runtime checks that enforce constraints on the program to ensure data integrity, program flow integrity, and to prevent faults/failures.

Moreover, the templates, in one approach, further indicate variables that are, for example, customized by the instrumentation module 150 according to a particular code segment with which the instrumentation is included. That is, the instrumentation module 150, in one example, may include instrumentation to verify a return address of a function or control access to a variable. Thus, the instrumentation module 150 modifies variables of an associated instrumentation statement from the template to correspond with the associated source code and provide security, fault protection, or other functionality for the associated source code segment by using the template as a form upon which the specific instrumentation is constructed. Further aspects of the instrumentation policy 190 and the instrumentation module 150 will be discussed subsequently.

Continuing with FIG. 1, the analysis module 130, in one embodiment, includes computer-readable instructions that when executed by the processor 110, cause the processor 110 to detect a code segment being added to the source code or another condition (e.g., an electronic request) that initiates analysis of the source code. In one approach, the analysis module 130 accesses the IDE internally through an application program interface (API) or other program hook to monitor an electronic input stream within the IDE. The electronic input stream generally includes electronic inputs provided into the IDE through other system components of an associated computing device. For example, the analysis module 130 monitors electronic inputs from other processes executing on the processor 110, electronic communications received via a network communication interface, intra-process (i.e., within the IDE) communications, I/O inputs from machine interface devices connected with the computing device (e.g., keyboard), file system resources, and so on.

Accordingly, the analysis module 130, in one approach, monitors the noted electronic inputs for modifications to the source code or inputs specifying a discrete request to analyze the source code. Moreover, the analysis module 130, in one embodiment, also includes instructions to analyze the source code to identify control flow characteristics, safety-related functions, and fault characteristics of the source code. That is, in one approach, as changes are made within the source code, the analysis module 130 actively detects the changes in real-time as the changes are occurring, and analyzes the source code to identify the noted aspects. In one embodiment, the control flow characteristics include intra-procedural and/or inter-procedural control flow transfers of the program such as function calls, and return address along with symbolic names, function arguments and return values, along with a calling convention, and so on. More generally, the control flow characteristics relate to aspects that influence the execution of the program resulting in handovers, exits, jumps, etc.

Furthermore, the control flow characteristics may also include aspects relating to non-control data such as current states of a data argument at different points in the source code, relationships associated with the data argument (e.g., functions to which the variable is passed and/or that can manipulate the variable), and so on. More generally, characteristics of the non-control data identify variables and permitted uses/accesses of the variables. Thus, the analysis module 130, in one embodiment, undertakes the noted monitoring and analysis in real-time in order to identify the control flow/data characteristics so that the graph module 140 can maintain the graph 170 in an updated form in relation to various aspects of the source code.

Additionally, the analysis module 130 includes instructions to cause the processor 110 to identify safety-related functions in the source code. In one embodiment, the analysis module 130 identifies the safety-related functions according to defined tags included within the source code as the source code is developed. In further embodiments, the graph policy 180 indicates characteristics associated with the safety-related functions that are employed by the analysis module 130 to automatically identify the safety-related functions. In one embodiment, the characteristics include overall functionality related to control of devices of which failure can result in injury to a person, functionality that produces values used by other functions and errors which can propagate resulting in such faults, and, more generally, functions of the program that affect functional safety. The effect on functional safety is generally assessed, for example, according to a probability that a particular function will experience a dangerous failure/fault. Thus, the safety-related characteristics that identify the functions can include particular I/O permissions/accesses, data handling in relation to particular variables, access to faulty/buggy hardware components, access to various APIs, and similar characteristics.

The analysis module 130 further performs fault tree analysis on the safety-related functions to produce a fault tree. In one embodiment, the fault tree is comprised of events, and logic describing relationships of faults to events. The events are conditions associated with interval values produced by the program, I/O variables/values, execution states associated with the program and internal/external values, interactions with various hardware components, and so on. The analysis module 130 references, for example, the graph policy 180 that indicates the combination of conditions and relationships therebetween that result in the faults. In one approach, the graph policy 180 is generally implemented to include awareness of such faults through listings of known bugs, executing of the program in a test environment that identifies the faults, and so on.

In either case, the analysis module 130 performs the fault tree analysis by parsing the safety-related function to identify constituent parts thereof, determine whether the parts of the function satisfy the noted conditions identified in the graph policy 180, and producing the fault tree as a manner of tracking which aspects of the safety-related function produce the faults and under which conditions the faults may be generated. In one embodiment, the analysis module 130 implements software fault tree analysis (FTA). As such, the analysis module 130 generates the fault tree to include the combination of conditions through the use of logic gates and event/variable identifiers as previously discussed in relation to FIG. 4. The resulting fault tree provides a condensed representation of hazardous execution paths within the program and potential faults that may result therefrom when the combination of conditions are satisfied. Thus, the fault control system 100 is generally employed to prevent the faults from developing or to at least prevent the faults from causing an associated device (e.g., controller within a vehicle) to fail.

Accordingly, the graph module 140 includes, in one embodiment, computer-readable instructions that when executed by the processor 110, cause the processor 110 to generate the control flow graph 170 according to the control flow characteristics. It should be noted that the graph module 140, in general, generates the graph 170 as an electronic data structure that includes programmatic elements for representing the nodes and directed edges along with annotations/tags about non-control data arguments and aspects associated with the fault tree. Initially, the graph module 140 generates the graph 170 including null values or an entry node from which the graph module 140 builds the graph 170 through analysis of various paths through the program.

In one approach, the graph module 140 updates the graph 170 in real-time as adjustments/modifications are made to the graph 170. Alternatively, as previously noted, the graph module 140 may generate the graph 170 upon receiving an electronic request that is, for example, intermittent, upon completion of the source code, prior to compiling the source code, and so on. Thus, the graph module 140 develops the graph 170, in one embodiment, in a piecewise manner as the modifications/additions occur in order to provide a real-time assessment of the program defined by the source code.

Additionally, the graph module 140 uses the fault tree, which is generated in parallel with the control flow graph, to further include information about the combination of conditions that produce the identified faults. As previously described, the graph module 140 enhances the graph 170 by annotating the nodes and edges of the graph 170 with information that identifies the conditions and when the faults are to occur. Accordingly, the graph module 140 generates the graph 170 to include a comprehensive assessment of control flow characteristics and the fault tree so that additional functionality can be facilitated therefrom.

As a further aspect, the graph module 140, in one embodiment, further includes instructions to electronically provide the control flow graph 170 to facilitate adjustments in the source code such as inclusion of instrumentation. The graph 170 represents possible execution paths and associated conditions related to the execution. Accordingly, the graph 170 provides insights into potential errors within the source code (e.g., infinite loops, exposed functions, unsecured data, faults, etc.) that can be leveraged by various modules and systems to improve the source code in order to avoid difficulties (e.g., security holes, program faults, etc.) in the program once compiled.

As such, the graph module 140, in one embodiment, provides the graph 170 by generating a visual representation of the control flow graph 170 and dynamically displaying the visual representation within the integrated development environment (IDE). Additionally, in alternative embodiments, the graph module 140 provides the graph 170 to further modules/components within the system 100 or systems/modules that are remote from the graph module 140.

For example, in one embodiment, the fault control system 100 includes an instrumentation module 150. The instrumentation module 150 includes instructions that when executed by a processor cause the processor (e.g., processor 110) to integrate instrumentation within the source code according to the control flow graph 170. For example, in one approach, the instrumentation module 150 adds instrumentation into the source code that provides runtime checks within the program when executing. The runtime checks act as supervisory processes to ensure program flow, data integrity, and to prevent faults/failures arising in the program due to the combination of conditions identified in the fault tree.

Accordingly, the instrumentation module 150 can monitor for particular conditions such as changes in the graph 170, inclusion of new code segments in the source code, modifications to existing code segments, discrete requests, and so on, which act as electronic requests into the instrumentation module 150 through, for example, an API of the IDE or another suitable mechanism. The electronic requests induce the instrumentation module 150, in one embodiment, to include instrumentation within the source code such that the runtime checks are implemented to protect the noted aspects of the program.

As previously noted, the instrumentation policy 190 indicates various mechanisms for identifying which aspects of the source code (e.g., via metrics or other conditions for identifying locations and types of instrumentation) are to be instrumented. In various approaches, the instrumentation included by the instrumentation module 150 is to enforce runtime checks within the program by ensuring execution of the program follows the control flow graph 170, ensuring the integrity of particular data arguments, and/or monitoring the conditions associated with the fault tree to prevent the faults. Thus, the instrumentation module 150 generally uses the knowledge conveyed via the graph 170 in order to know how to include instrumentation within the source code. Thus, the instrumentation module 150, in one embodiment, includes instrumentation to perform address checks (e.g., memory addresses for data and program flow), variable/function return type checks, data-bound checks, opcode checks, match call-return pairs (non-single class), and so on.

Of course, while the instrumentation module 150 is discussed as dynamically including the instrumentation within source code in real-time, the instrumentation module 150, in an alternative arrangement, executes over a completed or initial version of the source code to add the instrumentation. In one approach, the instrumentation module 150 automatically adds the instrumentation when initiated in parallel with a request to compile the source code into the program.

In either arrangement, the instrumentation module 150 analyzes the source code and the control flow graph 170 to integrate instrumentation within the source code. In particular, the instrumentation module 150 identifies segments of the source code that are to be instrumented according to correlations between the control flow graph 170 and the source code such as procedural transitions within the source code as identified by directed edges in the graph 170, locations where a data argument is used/modified as identified in the graph 170, hazardous paths where particular conditions generate faults, and so on. Moreover, the instrumentation module 150 automatically adds the instrumentation according to the identified segments by modifying templates of defined instrumentation to customize the defined instrumentation of the templates according to the source code. In this way, defined sets of instrumentation can be, for example, pre-tested and certified in order to ensure the added instrumentation performs as desired.

Figure 7:
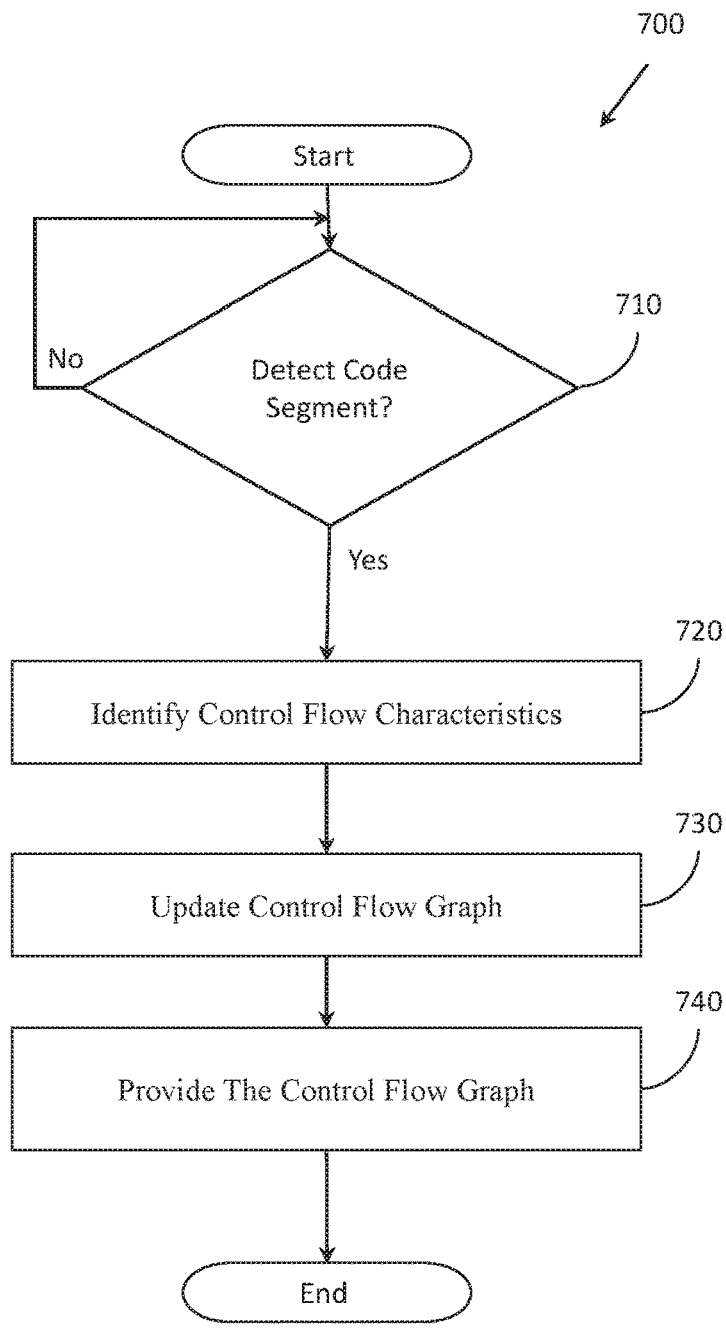
FIG. 7 illustrates one embodiment of a method associated with generating a control flow graph.

Additional aspects of generating control flow graphs and providing further functionality therefrom will be discussed in relation to FIG. 7. FIG. 7 illustrates a method 700 associated with generating control flow graphs. Method 700 will be discussed from the perspective of the fault control system 100 of FIG. 1. While method 700 is discussed in combination with the fault control system 100, it should be appreciated that the method 700 is not limited to being implemented within the fault control system 100 but is instead one example of a system that may implement the method 700.

At 710, the analysis module 130 monitors for a code segment being added to the source code of the program. It should be noted, that as used herein, adding a code segment at 710 generally refers to adding new code segments, and also modifying existing code segments within the source code of the program. More generally, the analysis module 130 monitors an electronic input stream into an integrated development environment (IDE) within a computing device for inputs (e.g., code, commands, etc.) that involve changes to the source code. Accordingly, the analysis module 130, in one embodiment, continuously monitors the input stream into the IDE through, for example, an API to identify when the source code is being modified (i.e., added to or changed). Consequently, upon detecting the noted modification, the analysis module 130 proceeds to identify control flow characteristics at block 720. Of course, while the method 700 is discussed in relation to real-time detection and generation of the graph 170, in further aspects, the analysis module 130 detects an electronic request or other indication at 710 that may be generated when the source code is complete, or at another time and that initiates the analysis of the source code.

At 720, the analysis module 130 identifies the control flow characteristics of the graph 170. In one embodiment, the analysis module 130 analyzes the source code using a depth-first search to traverse statements within the source code. In further aspects, the analysis module 130 implements other suitable approaches to traversing the source code and identifying the characteristics as may be appreciated. When the analysis module 130 is traversing the source code, the module 130 is parsing statements within the source code to identify at least function calls, function return addresses, concrete and symbolic function arguments, function return values, and relationships between the statements as the control flow characteristics.

In various implementations, the analysis module 130 analyzes portions of the source code associated with detected modifications, while in further aspects, the analysis module 130 re-analyzes the source code overall to identify the control flow characteristics. In general, the approach that is undertaken is related to an overall size of the source code, a size of the modification, and available resources for performing the analysis. Thus, in one embodiment, the analysis module 130 selectively undertakes a partial or full review to determine the control flow characteristics according to an indicated preference. Whichever approach is performed by the analysis module 130, the control flow characteristics provide information about intra-procedural and/or inter-procedural control flow transfers of the program that are to be represented in the graph 170.

In further embodiments, the analysis module 130, at 720, also analyzes the source code to identify non-control data arguments as part of the control flow characteristics. The analysis module 130 identifies the data arguments according to, for example, indicators specified by the graph policy 180 such as data types and associations of the data types that define whether the data argument is a control or non-control data argument. In either case, the analysis module 130 parses the source code at the code segment to identify the data argument(s) and harvest therefrom the data characteristics. In one embodiment, the data characteristics indicate a state of the data argument at various points in the control flow graph 170 and at least one relationship associated with the data argument (e.g., functions to which the data argument is passed). Furthermore, the state indicates a type of access or use that can include at least one of set/initiated, used, and modified to identify permissible interactions with the data argument.

Additionally, the analysis module 130, in one embodiment, further identifies which statements of the source code include vulnerabilities by comparing the control flow characteristics with the graph policy 180. In one embodiment, the graph policy 180 defines conditions indicative of security vulnerabilities and performance bottlenecks. Accordingly, the additional information about vulnerabilities and bottlenecks can also be included within the control flow characteristics such that the information is subsequently integrated with the graph 170 to provide further indications about characteristics of different portions of the source code. In either case, the analysis module 130 can include aspects that are both directly and indirectly related to the program flow within the control flow characteristics for inclusion in the graph 170.

At 730, the graph module 140 generates the control flow graph 170. In one embodiment, the graph module 140 uses the control flow characteristics identified at 720 in order to form nodes and directed edges of the graph 170. Moreover, in one embodiment, the graph module 140 generates the graph 170 in a piecewise manner as aspects are added to the source code. Furthermore, consider that the control flow graph 170 generally represents execution paths through the program, and thus the graph module 140 uses the control flow characteristics to identify the paths (e.g., directed edges) between different code segments (e.g., nodes) from which the graph 170 is formed. Thus, the graph module 140 updates the control flow graph 170 by adding the control flow characteristics corresponding to the detected code segment while modifying existing nodes and edges of the control flow graph to accommodate the code segment. That is, for example, existing directed edges may be re-routed while additional nodes are added, existing nodes may be modified, indicated conditions can be modified or new conditions added, and so on. Of course, in further aspects, the graph module 140 can wholly generate the graph 170 at once instead of doing so in a piecewise manner.

At 740, the graph module 140 provides the control flow graph 170 to facilitate adjustments in the source code and thereby improve the program. As previously explained, the control flow graph 170 provides a representation of execution of the program along with related aspects such as the noted data arguments and thus provides insights about the source code that are generally otherwise not identifiable. As such, various systems can leverage the graph 170 to manipulate the source code and/or provide further functionality to developers.

Figure 8:
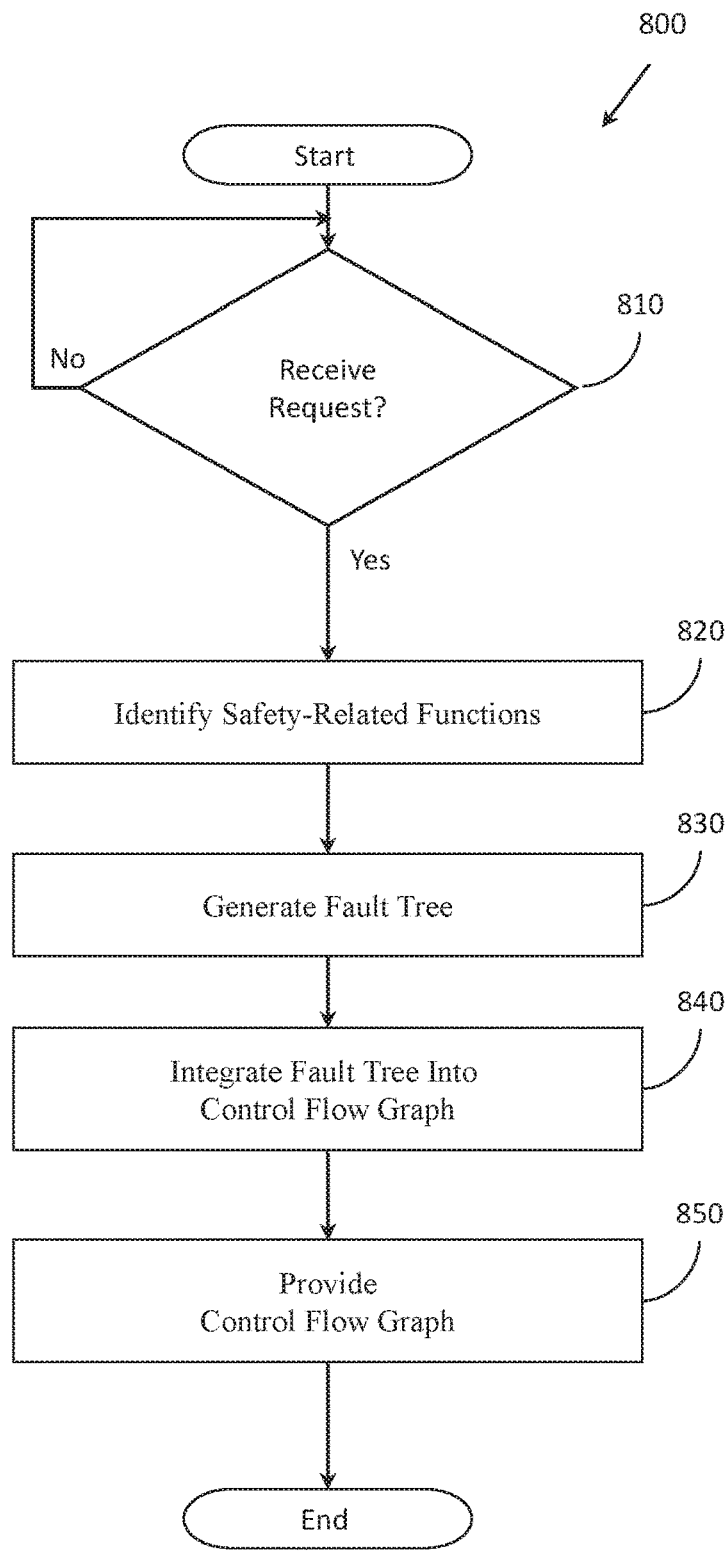
FIG. 8 illustrates one embodiment of a method associated with identifying safety-related functions and generating a fault tree.

Additional aspects of generating control flow graphs, and, in particular, producing fault trees that are integrated with the control flow graph 170 will be discussed in relation to FIG. 8. FIG. 8 illustrates a method 800 associated with validating data arguments by integrating data characteristics of non-control data arguments into a control flow graph. Method 800 will be discussed from the perspective of the fault control system 100 of FIG. 1. While method 800 is discussed in combination with the fault control system 100, it should be appreciated that the method 800 is not limited to being implemented within the fault control system 100 but is instead one example of a system that may implement the method 900. Moreover, while method 800 is generally discussed in isolation from method 800, it should be appreciated that both method 700 and method 800, in one approach, execute in parallel to generate relevant information that is used to populate the graph 170 and subsequently employed by the instrumentation module 150 and/or other systems to facilitate additional functionality.

At 810, the analysis module 130 monitors for a request. In one embodiment, the request is an electronic request that is generated to initiate the fault tree analysis. In various approaches, the request originates from varying sources. For example, the request may be generated in response to modifications in the source code, in response to a request to instrument the source code, in response to a request to compile the source code, and so on. In general, the method 800 may be instantiated according to different events. However, the method 800 generally executes in parallel with the method 700, and thus may be executed in response to the same or similar occurrences.

At 820, the analysis module 130 identifies one or more safety-related functions. In one embodiment, the identification of safety-related functions at block 820 occurs in parallel with the identification of control flow characteristics at block 720 of method 700. The analysis module 130 identifies the safety-related functions according to, for example, indicators specified by the graph policy 180 such as a potential or probability to result in injury or damage. Thus, the analysis module 130, in one approach, scans the source code for characteristics identified by the policy 180 that are indicative of safety-related functions. As a general matter, the graph policy 180 may specify particular faults that may occur in relation to a function such as safety violations, and failures that may be caused in the associated device.

In further aspects, the safety-related functions may be pre-labeled or otherwise tagged within the source code. In such a case, identification of the safety-related function(s) includes the analysis module 130 scanning the source code for the labels. In either case, the safety-related functions are functions that influence, impact, or otherwise affect the functional safety of an associated device. The associated device is, for example, a vehicle or other device for which failure of the program could result in injury to persons or damage to the device or other devices within a proximity of the device. Moreover, the functional safety is, in one embodiment, defined according to a functional safety standard, which is an industry-specific standard that relates to the particular type of device. Thus, in the instance of a vehicle, the functional safety standard is, for example, ISO 26262 or another suitable functional safety standard.

At 830, the analysis module 130 analyzes the safety-related function to produce a fault tree. In one embodiment, the analysis module 130 performs fault tree analysis and uses Boolean logic gates with the execution states to represent when the faults occur and which execution paths in the program are hazardous. The conditions include at least execution states of the program derived from inputs to the program and internally produced values of the program that result in the faults. As previously indicated, the faults may be defined according to a functional safety standard, or are otherwise identified according to characteristics shared between the function and associated hardware associated with the function (e.g., hardware controlled by the function). Moreover, in one embodiment, the fault tree itself is comprised of identified aspects of the source code and relationships between the identified aspects that produce the faults.

Additionally, the analysis module 130, in one embodiment, further identifies which statements of the source code are associated with vulnerabilities that lead to the faults by comparing aspects of the graph policy 180 that are indicative of the faults with the statements in the source code. In one embodiment, the graph policy 180 defines conditions indicative of the faults. In an alternative embodiment, the analysis module 130 implements software fault tree analysis (FTA) as may be appreciated in the art. In either case, the analysis module 130 identifies the conditions and forms the graph according to logical combinations of the conditions that are determined to result in a fault.

At 840, the graph module 140 integrates the fault tree into the control flow graph 170. In one embodiment, the graph module 140 uses identifying information from the fault tree as provided at 820 to generate annotations/tags that are stored in the graph 170 at locations corresponding with portrayed conditions. That is, for example, nodes and edges of the graph 170 are annotated/tagged with the fault characteristics embodied within the fault tree such that various execution paths through the graph 170 are annotated to indicate whether the paths are hazardous and, if so, which conditions result in the path being hazardous and producing faults. As such, for a node representing a particular code block and related to a condition identified in the fault tree, the graph module 140 adds relevant annotations into the node to indicate the relationship and characteristics of the access. Accordingly, not only does the graph module 140 actively develop the graph 170 to include aspects relating to program control flow but the graph module 140 also provides additional information about the fault tree to enhance the graph 170 with further information.

At 850, the graph module 140 provides the control flow graph 170 as an electronic output. As previously explained, the control flow graph 170 provides a representation of how the execution of the program will progress along with characterizations as to the use of data arguments at various steps in the execution and conditions related to hazardous paths that can produce faults in the program under particular combinations of conditions. Thus, the graph 170 provides insights about the source code that are generally otherwise not identifiable. As such, various systems can leverage the graph 170 to manipulate the source code and/or provide further functionality.

As one aspect of providing the control flow graph 170 at 850, the graph module 140 electronically communicates the graph 170 to the instrumentation module 150 so that segments of the source code identified in the control flow graph 170 can be instrumented to ensure data integrity, program flow integrity, and fault tolerance through inclusion of runtime checks by the addition of instrumentation. Moreover, as previously explained, the graph module 140, in one embodiment, may also provide the graph 170 as an electronic output in the form of a visual representation that is displayed to a developer on an electronic display. Thus, the graph 170 may be represented by nodes, edges, annotations, and so on and provided as a visualization to facilitate development.

Figure 9:
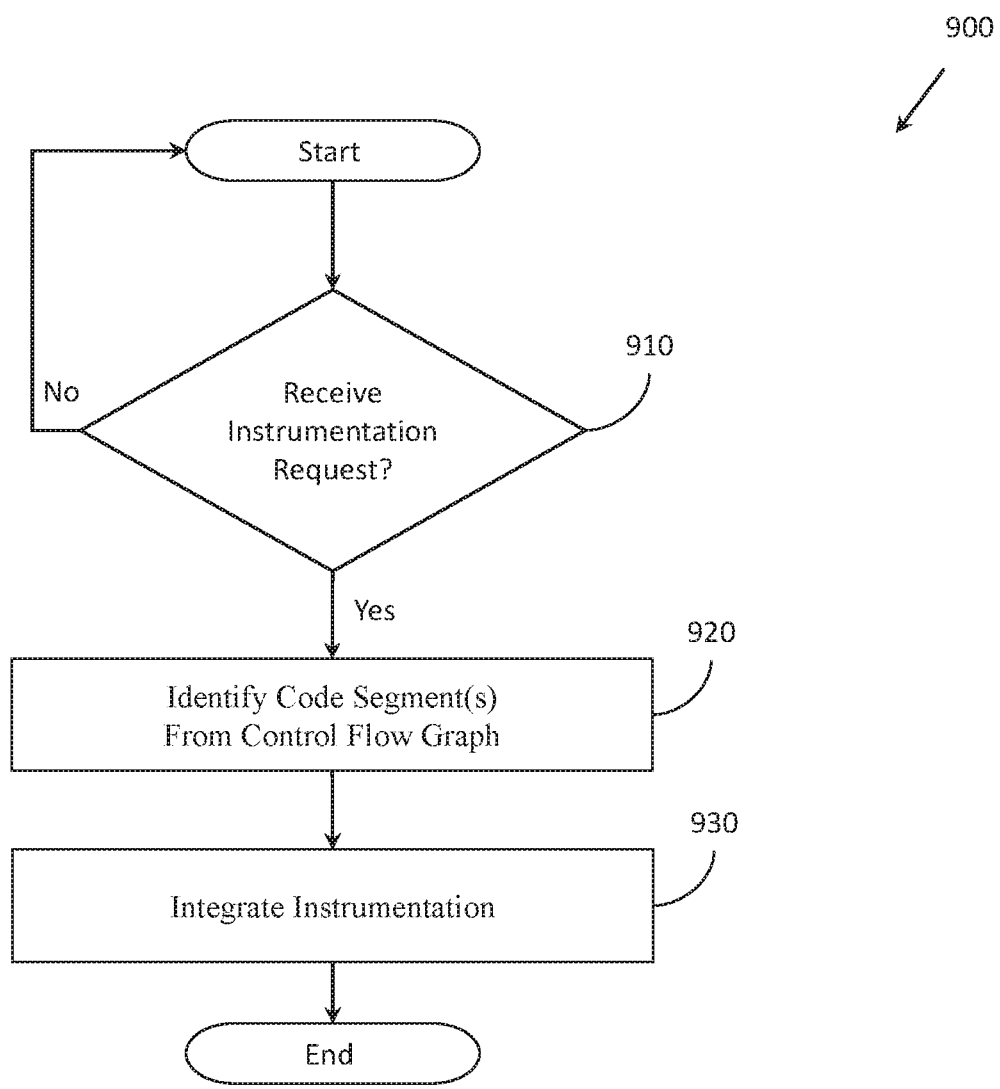
FIG. 9 illustrates one embodiment of a method associated with automatically instrumenting source code.

FIG. 9 illustrates a method 900 associated with automatically instrumenting source code of a program. In a similar fashion as discussed in relation to FIGS. 7-8, method 900 will be discussed from the perspective of the fault control system 100 of FIG. 1. While method 900 is discussed in combination with the fault control system 100, it should be appreciated that the method 900 is not limited to being implemented within the fault control system 100 but is instead one example of a system that may implement the method 900.

As an initial note, method 900 is illustrated as including blocks 910, 920, and 930, which should generally be understood to accept as an electronic input the graph 170, which is produced from the parallel execution of methods 700 and 800.

At 910, the instrumentation module 150 monitors for a request to instrument the source code. In various embodiments, the request may take different forms. For example, in one approach, the request is coincident with modifications to the source code for which the graph 170 is also modified. That is, when the graph 170 is updated according to modifications to the source code, the instrumentation module 150 also functions to instrument the source code in real-time for the modifications.

Alternatively, the instrumentation request is generated by the system 100 once the source code is completed or, in a further aspect, when the source code is to be compiled into the program. Accordingly, the request to instrument the source code is, in one embodiment, generated by the system 100 in response to a request to compile the source code generated within the IDE, and is acted upon prior to the compiling. Thus, the instrumentation module 150 functions in real-time to instrument the source code as the source code is modified or once the source code is ready to be compiled. In still further aspects, the instrumentation module 150 instruments the source code in response to a request to add runtime checks within the program. In either case, the instrumentation module 150 monitors for the request, which generally includes the graph 170. That is, the system 100 provides the graph 170 to the instrumentation module 150 along with or as part of the request at 910.

At 920, the instrumentation module 150 identifies sections (e.g., code segments or individual statements) of the source code that are to be instrumented. In one embodiment, the instrumentation module 150 identifies the code segments according to labeled characteristics in the graph 170 associated with the code segments, according to identified control flows represented in the graph 170, according to identified non-control data arguments in the graph 170, according to hazardous paths annotated in the graph 170 from the fault tree, and/or according to further metrics/characteristics as defined by the instrumentation policy 190. In general, the instrumentation module 150 is instrumenting the source code to ensure the program flow integrity, data integrity, and/or fault tolerance of the program during execution. Thus, the instrumentation module 150 identifies aspects of the program that are at risk for generating faults, involved in directly or indirectly transferring control between functions, adjusting program flow addresses, manipulating data arguments, and other such code segments. In general, the noted code segments are associated with the nodes and the directed edges within the graph 170 or conditions associated with the nodes and edges (e.g., control transfers embodied by the directed edges).

Accordingly, in further aspects, the instrumentation module 150 analyzes the source code according to the control flow graph 170. The instrumentation module 150 also, in one or more embodiments, may analyze the individual code segments in order to determine whether the code segments satisfy the instrumentation policy 190 as implemented for including instrumentation. That is, various conditions such as thresholds according to importance level, security level, etc. can be identified for determining when to include instrumentation within a function/statement and, for example, to what extent the instrumentation is to be included (e.g., fully instrumented versus cursory/minimal instrumentation). In this way, the instrumentation can be included in an intelligent manner so as to consider the performance and security of the program and to avoid unnecessarily including instrumentation or too much instrumentation when possibly not needed.

In either case, because the instrumentation module 150 can implement policies where not all code segments/functions within the source code are to be instrumented and/or fully instrumented, the check at 920 may include assessing whether the code segment is to be instrumented and to what extent. That is, for example, the instrumentation module 150 assesses the characteristics of the separate code segments/statements/functions to determine whether to include instrumentation and what level of instrumentation (e.g., how robust/pervasive) is to be included. If the instrumentation module 150 determines instrumentation is to be included, then the instrumentation module 150 continues to integrate the instrumentation as discussed at block 930. Otherwise, the instrumentation module 150 may annotate or otherwise log that the particular aspect of the program is not to include instrumentation.

At 930, the instrumentation module 150 integrates instrumentation within the source code. As previously noted, in one embodiment, the instrumentation module 150 includes the instrumentation for control data arguments, non-control data arguments, and to enforce the fault tree. As a result, the instrumentation included in the source code implements runtime checks that are essentially supervisory processes integrated within the program. The runtime checks monitor execution of the program to ensure data integrity, program control flow integrity, and fault prevention.

For example, the runtime checks may function to ensure the program is not directed outside of the execution paths represented by the graph 170, ensure that data (i.e., variables) is not maliciously modified outside of identified permissible uses/modifications identified from the source code, ensure that conditions that can result in faults do not occur or, if they do occur, ensure the faults are handled without catastrophic failure of the program. In one approach, the instrumentation implements the runtime checks to catch the faults and thereby redirect the program to a failover routine where the program can recover or handover control to a backup process that prevents injury or damage to the associated device. By way of example, where the associated device is a controller in a vehicle that provides automatic braking, and the fault is a condition where the program errantly applies an emergency braking condition to the brakes of the vehicle, the runtime check identifies the occurrence of conditions leading up to the fault, and passes control over to a backup process that identifies the failure while also preventing the emergency braking condition. In this way, fault tolerance of the program is improved through the automatic identification of hazardous execution paths in the program and automatic inclusion of instrumentation that prevents faults associated with the hazardous paths.

Moreover, the process of integrating the instrumentation includes, in one embodiment, the instrumentation module 150 automatically adding the instrumentation according to the identified segments by modifying templates of defined instrumentation according to the source code. The instrumentation module 150 adjusts variables of the templates to conform to a code segment with which the instrumentation is being integrated. Accordingly, the instrumentation module 150 customizes the included instrumentation to achieve the particular functionality while also using instrumentation that is, for example, pre-approved and generally known to function correctly. In this way, the instrumentation module 150 uses the graph 170 to provide additional functionality that ultimately improves the resulting program through runtime checks implemented via the instrumentation. In this way, the resulting program is improved through better instrumentation that ensures the security of the program from malicious attacks and prevention of faults.

Additionally, it should be appreciated that the fault control system 100 from FIG. 1 can be configured in various arrangements with separate integrated circuits and/or chips. In such embodiments, the analysis module 130 from FIG. 1 is embodied as a separate integrated circuit. Additionally, the graph module 140 is embodied on an individual integrated circuit. Moreover, the instrumentation module 150 is embodied on a separate integrated circuit. The circuits are connected via connection paths to provide for communicating signals between the separate circuits. Of course, while separate integrated circuits are discussed, in various embodiments, the circuits may be integrated into a common integrated circuit board. Additionally, the integrated circuits may be combined into fewer integrated circuits or divided into more integrated circuits. In another embodiment, the modules 130, 140, and 150 may be combined into a separate application-specific integrated circuit. In further embodiments, portions of the functionality associated with the modules 130, 140, and 150 may be embodied as firmware executable by a processor and stored in a non-transitory memory. In still further embodiments, the modules 130, 140, and 150 are integrated as hardware components of the processor 110.

In another embodiment, the described methods and/or their equivalents may be implemented with computer-executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The fault control system 100 can include one or more processors 110. In one or more arrangements, the processor(s) 110 can be a main processor of the fault control system 100. For instance, the processor(s) 110 can be an electronic control unit (ECU). The fault control system 100 can include one or more data stores for storing one or more types of data. The data stores can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, distributed memories, cloud-based memories, other storage medium that are suitable for storing the disclosed data, or any combination thereof. The data stores can be a component of the processor(s) 110, or the data store can be operatively connected to the processor(s) 110 for use thereby. The term "operatively connected," as used throughout this description, can include direct or indirect connections, including connections without direct physical contact.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term, and that may be used for various implementations. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), a graphics processing unit (GPU) or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Python, Go, Java™, Ruby, Objective-C, Visual Basic .NET, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A fault control system for improving control flow in a program for safety-related functions, comprising:
one or more processors;
a memory communicably coupled to the one or more processors and storing:
an analysis module including instructions that when executed by the one or more processors cause the one or more processors to identify a safety-related function of the program, wherein the safety-related function is associated with functionality performed by the program that effects whether an associated device operates according to a functional safety standard, and
wherein the analysis module includes instructions to identify the safety-related function by using a graph policy to determine which segments of source code exhibit characteristics associated with the safety-related functions; and
a graph module including instructions that when executed by the one or more processors cause the one or more processors to integrate a fault tree for the safety-related function into associated portions of a control flow graph of the program, wherein the control flow graph identifies at least procedural control flows within the program and the fault tree indicates combinations of conditions in the program that produce faults by the program, and
wherein the graph module includes instructions to provide the control flow graph as an electronic output to improve the control flow of the program.

2. The fault control system of claim 1, wherein the analysis module further includes instructions to analyze the safety-related function to produce the fault tree, wherein the conditions include at least execution states of the program derived from inputs to the program and internally produced values of the program that result in the faults, and
wherein the analysis module includes instructions to analyze the safety-related function to produce the fault tree including instructions to perform fault tree analysis using Boolean logic with the execution states to identify when the faults occur and which execution paths in the program are hazardous.

3. The fault control system of claim 1, wherein the graph module includes instructions to integrate the fault tree for the safety-related function into the control flow graph of the program to combine the control flow graph and the fault tree into a single structure, and
   wherein the characteristics include control of devices of which failure can result in injury to a person and relate to combinations of conditions along one or more control paths of the control flow graph.

4. The fault control system of claim 1, wherein the faults include at least safety violations, and program failures in the associated device, and
   wherein the graph module includes instructions to integrate the fault tree by annotating hazardous paths within the control flow graph that can result in the faults.

5. The fault control system of claim 1, wherein the graph module further includes instructions to generate the control flow graph according to control flow characteristics identified from the source code of the program,
   wherein the control flow graph is comprised of nodes representing blocks of the source code and directed edges between the nodes representing control handovers between the blocks, and wherein the fault tree is comprised of identified aspects of the source code and relationships between the identified aspects that produce the faults.

6. The fault control system of claim 5, wherein the graph module includes instructions to generate the control flow graph in-parallel with producing the fault tree.

7. The fault control system of claim 1, further comprising:
   an instrumentation module including instructions that when executed by the one or more processors cause the one or more processors to integrate instrumentation within the source code according to the control flow graph, wherein the instrumentation module includes instructions to integrate the instrumentation including instructions to automatically add the instrumentation into the source code by modifying templates of defined instrumentation that provide runtime checks according to the control flow graph, and
   wherein the runtime checks monitor at least execution paths in the program to ensure program flow integrity and prevent the faults identified by the fault tree from occurring.

8. The fault control system of claim 7, wherein the instrumentation module includes instructions to integrate the instrumentation including instructions to add the instrumentation to avoid the faults by redirecting the program to execute an alternative path in the control flow graph.

9. A non-transitory computer-readable medium storing instructions for improving flow in a program for safety-related functions and that when executed by one or more processors cause the one or more processors to:
   identify a safety-related function of the program, wherein the safety-related function is associated with functionality performed by the program that effects whether an associated device operates according to a functional safety standard,
   wherein the instructions to identify the safety-related function include instructions to use a graph policy to determine which segments of source code exhibit characteristics associated with the safety-related functions;
   integrate a fault tree for the safety-related function into associated portions of a control flow graph of the program, wherein the control flow graph identifies at least procedural control flows within the program and the fault tree indicates combinations of conditions in the program that produce faults by the program; and
   provide the control flow graph as an electronic output to improve the control flow of the program.

10. The non-transitory computer-readable medium of claim 9, wherein the instructions include instructions to analyze the safety-related function to produce the fault tree, wherein the conditions include at least execution states of the program derived from inputs to the program and internally produced values of the program that result in the faults, and
   wherein the instructions to analyze the safety-related function to produce the fault tree include instructions to perform fault tree analysis using Boolean logic with the execution states to identify when the faults occur and which execution paths in the program are hazardous.

11. The non-transitory computer-readable medium of claim 9, wherein the instructions include instructions to integrate the fault tree for the safety-related function into the control flow graph of the program to combine the control flow graph and the fault tree into a single structure, and
   wherein the characteristics include control of devices of which failure can result in injury to a person.

12. The non-transitory computer-readable medium of claim 9, wherein the faults include at least safety violations, and program failures in the associated device, and
   wherein the instructions to integrate the fault tree include instructions to annotate hazardous paths within the control flow graph that can result in the faults.

13. The non-transitory computer-readable medium of claim 9, wherein the instructions include instructions to generate the control flow graph according to control flow characteristics identified from the source code of the program,
   wherein the control flow graph is comprised of nodes representing blocks of the source code and directed edges between the nodes representing control handovers between the blocks, and wherein the fault tree is comprised of identified aspects of the source code and relationships between the identified aspects that produce the faults.

14. A method of improving flow in a program for safety-related functions, comprising:
   identifying a safety-related function of the program, wherein the safety-related function is associated with functionality performed by the program that effects whether an associated device operates according to a functional safety standard,
   wherein identifying the safety-related function includes using a graph policy to determine which segments of source code exhibit characteristics associated with the safety-related functions;
   integrating a fault tree for the safety-related function into associated portions of a control flow graph of the program, wherein the control flow graph identifies at least procedural control flows within the program and the fault tree indicates combinations of conditions in the program that produce faults by the program; and
   providing the control flow graph as an electronic output to improve the control flow of the program.

15. The method of claim 14, further comprising:
   analyzing the safety-related function to produce the fault tree, wherein the conditions include at least execution states of the program derived from inputs to the program and internally produced values of the program that result in the faults, wherein analyzing the safety-related function to produce the fault tree includes performing fault tree analysis using Boolean logic with the execution states to identify when the faults occur and which execution paths in the program are hazardous.

16. The method of claim 14, wherein integrating the fault tree for the safety-related function into the control flow graph of the program to combine the control flow graph and the fault tree into a single structure,
wherein the faults include at least safety violations, and failures in the associated device, and wherein integrating the fault tree annotates hazardous paths within the control flow graph that can result in the faults.

17. The method of claim 14, further comprising:
generating the control flow graph according to control flow characteristics identified from the source code of the program, wherein the control flow graph is comprised of nodes representing blocks of the source code and directed edges between the nodes representing control handovers between the blocks, and wherein the fault tree is comprised of identified aspects of the source code and relationships between the identified aspects that produce the faults.

18. The method of claim 17, wherein generating the control flow graph occurs in-parallel with producing the fault tree.

19. The method of claim 14, further comprising:
integrating instrumentation within the source code according to the control flow graph, wherein integrating the instrumentation includes automatically adding the instrumentation into the source code by modifying templates of defined instrumentation that provide runtime checks according to the control flow graph, and wherein the runtime checks monitor at least execution paths in the program to ensure program flow integrity and prevent the faults identified by the fault tree.

20. The method of claim 19, wherein integrating the instrumentation includes adding the instrumentation to avoid the faults by redirecting the program to execute an alternative path.

* * * * *